Feb. 21, 1933.   W. P. SMITH   1,898,907
SELF LOCKING BOLT AND NUT
Filed May 27, 1932
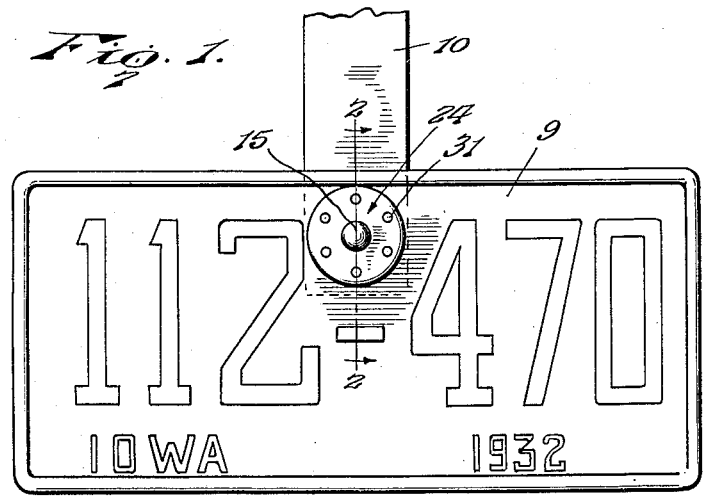
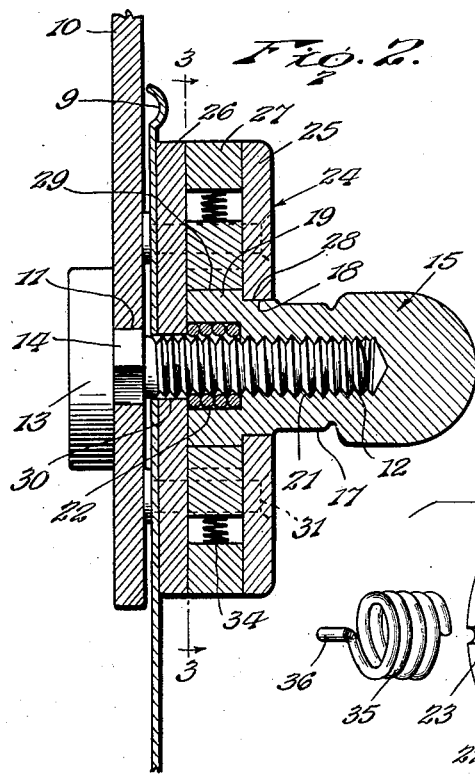
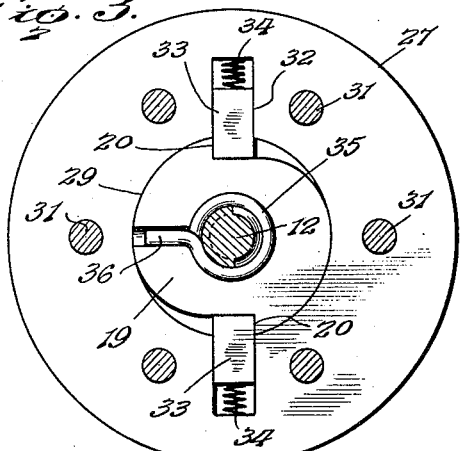
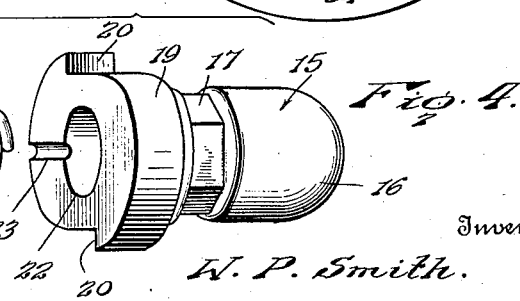
Inventor
W. P. Smith.
By Lacey & Lacey, Attorneys Patented Feb. 21, 1933

1,898,907

UNITED STATES PATENT OFFICE

WILLIAM P. SMITH, OF BAKER, OREGON

SELF LOCKING BOLT AND NUT

Application filed May 27, 1932. Serial No. 613,957.

This invention relates to bolts and nuts and has for an object broadly to provide a ratchet nut and bolt assembly including a clutch spring which operates to permit screwing on of the nut but which binds or wedges when unscrewing of the parts is attempted and permanently locks the bolt and nut together as a unit.

A further object is to provide a self locking bolt and nut which, when applied, can never be loosened and may be used for various purposes where safety is desired, as well as anti-rattling.

A further object is to provide a device of this type which may be readily applied to license plates for motor vehicles and will positively prevent surreptitiously changing of the license plates by unauthorized persons, and in fact will prevent removal of the plate at any time without destroying the plate as well as the device.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention. In the accompanying drawing forming part of this specification, Figure 1 is a front elevation of the device applied to secure a license plate to its holder, Figure 2 is a vertical section taken on the line 2—2 of Figure 1, Figure 3 is a vertical section taken on the line 3—3 of Figure 2, and Figure 4 is a perspective view of the nut and the clutch spring carried thereby.

Referring now to the drawing in which like characters of reference desginate similar parts in the various views, 9 designates a license plate and 10 the holder or bracket, which latter, in this instance, is illustrated as a straight metal bar provided with a rectangular opening 11, as shown in Figure 2.

The device comprising the subject matter of this invention consists of a bolt 12 which is passed through the opening 11 and is provided with a disk head 13 and a squared neck 14 which snugly fits in the opening 11 and prevents rotation of the bolt. The bolt is passed from the rear through the bracket 11 and presents its threaded shank beyond the face of the license plate.

The nut component comprises a nut proper 15, best shown in Figure 4, having a rounded grip 16 and a reduced neck 17 provided with wrench faces, the nut being formed with a cylindrical bearing surface 18 beyond the wrench faces and beyond the bearing surface being uniformly enlarged to provide a ratchet disk 19 in which, preferably at diametrically opposite points, there are formed ratchet teeth 20, as shown in Figure 3.

The nut is provided with a threaded axial opening 21 to receive the threaded shank of the bolt, and is axially provided in the end opposite the grip with a cylindrical recess 22 which is of greater diameter than the threaded opening 21. The end face of the ratchet disk 19 is provided with a radially extending groove 23, or there may be any number of these grooves as desired, which communicate with the recess 22.

The nut component also comprises a base, designated in general by the numeral 24, and including a pair of disks 25 and 26 between which there is interposed a spaced disk 27. The disk 25 is provided with an axial opening 28 to receive the bearing surface 18 of the nut proper. The spaced disk is provided with an axial opening 29 of sufficient diameter to receive the ratchet disk 19. The disk 26 is provided with an axial opening 30 of sufficient diameter to loosely receive the threaded shank of the bolt adjacent the squared neck 14. All three disks are preferably permanently secured together by an annular series of rivets 31 which also are passed through the license plate 9 to permanently associate the license plate and the nut component of the device as an integral unitary structure. Welding may be employed instead of rivets.

The spacer disk 27 is provided at diametrically opposite points on its inner circumference with radially extending openings 32 which receive dogs 33. Helical springs 34 are seated in the recesses behind the dogs and urge the dogs inwardly to lodge in rear of the teeth 20 and prevent retrograde rotation of the ratchet disk 19, as best shown in Figure 3.

A helical clutch spring 35 is seated in the above mentioned recess 22 of the ratchet disk and is of sufficient length to extend throughout the length of the recess and snugly surround the threaded shank of the bolt. The outer end of the spring is directed laterally, as shown at 36, and is seated in the above mentioned radially extending groove 23 in the end face of the ratchet disk. The end 36 of the spring tightens the spring firmly upon the threaded shank of the bolt should an attempt be made to rotate the nut component and license plate as a unit, and thus wedges the spring so tightly upon the stationary bolt as to thwart any such attempt.

In operation the bolt is first passed forwardly through the opening in the bracket until the square neck 14 lodges in the squared opening in the bracket. Thereupon the assembled nut component, including the nut proper 15, base 24, and also the license plate firmly secured thereto, are moved up to the bolt until the end of the threaded bolt shank engages the forward end of the threaded recess 21 in the nut proper 15. The nut proper 15 is now rotated clockwise on the stationary bolt, the dogs 33, meanwhile, riding freely over the ratchet teeth 20, until the nut proper is screwed down tightly on the bolt, as shown in Figure 2. During such movement of the nut proper the clutch spring 35 is undisturbed and will permit this movement. At the limit of movement of the nut proper the ratchet teeth 20, with the dogs 33 lodged behind them, positively prevent retrograde movement of the nut proper. Should an attempt be made, as above stated, to rotate the nut component and license plate as a unit on the bolt the spring 35 will be tightened and wedged upon the bolt so as to thwart such an attempt. Retrograde rotation of the bolt is impossible due to the walls of the squared opening 11 in the bracket conforming snugly to the contour of the squared neck 14 on the bolt. Even should the head of the bolt be removed by any tool the threaded shank will still remain in applied position and cannot be removed from the nut since, as above explained, relative retrograde movement of the bolt and the nut component is impossible due to the tightening of the clutch spring 35 by such movement. Consequently, it will be seen that the license plate is permanently associated with the self locking bolt and nut device and any attempt to change license plates must result in destruction of the device and license plate.

Although one application of the device has been described above, it will be understood that this is merely by way of example, and that the self locking bolt and nut device is capable of use wherever parts are to be joined permanently and when so assembled will be held against rattling.

Although rivets have been described as assembling the license plate with the nut component of the device, obviously welding or other permanent methods of assembly may be utilized, and the same is true with respect to other applications of the device.

What is claimed is:

1. In a self locking bolt and nut device including the combination with a bolt, of a nut component including a nut having a threaded bore adapted to receive the bolt, a ratchet tooth on the nut, there being a large axial recess at the outer end of the bore, a base surrounding the nut, a spring pressed dog carried by the base engaging said ratchet tooth, and a helical spring seated in said recess and having one end removably secured to said nut, said spring wedging said nut component on the bolt and preventing relative retrograde movement of the nut component and bolt.

2. A self locking bolt and nut device comprising a bolt, a nut adapted to be threaded on to the bolt and having a ratchet tooth, an annular base surrounding the nut, a spring pressed dog carried by the base engaging the ratchet tooth and preventing retrograde movement of the nut on the bolt, and a spring carried by the nut and adapted to be tightened on the bolt and prevent retrograde movement of the base and nut as a unit on the bolt.

3. A self locking bolt and nut device comprising a bolt having a squared neck, a nut having a rounded grip and having an annular bearing surface adjacent said grip, a ratchet disk integral with the nut, there being a recess formed in the end face of the nut of greater diameter than the diameter of the bolt, an annular base rotatably receiving said bearing surface, a spring pressed dog carried by the base engaging the ratchet disk, and a spring in said recess having one end secured to said nut and adapted to be wound upon the bolt and wedged between the bolt and nut to prevent retrograde movement of the nut and base as a unit on the bolt.

4. A self locking bolt and nut device comprising a bolt, a squared neck on the bolt adapted to hold the bolt stationary, a nut adapted to be received on the bolt and provided with wrench faces, a portion of the nut adjacent said faces being provided with an annular bearing surface, a ratchet disk integral with the nut adjacent said bearing surface, there being an axial recess formed in the nut of greater diameter than the bolt, a plurality of disks assembled as a unit, one of the disks having an opening rotatably receiving said circular bearing surface, another of the disks having an opening loosely receiving said bolt, there being a disk between the first two named disks having a radially disposed recess, a spring pressed dog in said recess engageable with said ratchet disk, the end face of said nut being provided with a radial groove communicating with said recess, and a helical spring adapted to surround said bolt and seated in said recess, said spring having one end directed outwardly and seated in said groove, said spring being adapted to be wound tightly upon the bolt and wedged against the wall of said recess by attempted relative movement of said disks and said nut as a unit with respect to said bolt and operating to prevent such movement.

In testimony whereof I affix my signature.

WILLIAM P. SMITH.